United States Patent [19]

Yonemitsu et al.

[11] 3,963,804

[45] June 15, 1976

[54] THERMOPLASTIC BLEND COMPOSITION

[75] Inventors: Eiichi Yonemitsu, Kashiwa; Akitoshi Sugio, Tokyo; Takanari Nawata, Tokyo; Masanobu Masu, Tokyo; Masaharu Kimura, Tokyo; Norio Sayama, Tokyo, all of Japan

[73] Assignee: Mitsubishi Gas Chemical Company, Inc., Tokyo, Japan

[22] Filed: Apr. 18, 1974

[21] Appl. No.: 462,177

[30] Foreign Application Priority Data

Apr. 18, 1973 Japan.............................. 48-43815

[52] U.S. Cl. .......................... 260/873; 260/45.7 P; 260/876 R; 260/876 B
[51] Int. Cl.² ..................................... C08L 67/06;
[58] Field of Search ............ 260/873, 876 R, 876 B

[56] References Cited
UNITED STATES PATENTS

| | | |
|---|---|---|
| 3,221,080 | 11/1965 | Fox ..................................... 260/860 |
| 3,660,531 | 5/1972 | Lauchlan et al. ................ 260/876 R |
| 3,663,471 | 5/1972 | Schirmer et al. .................... 260/873 |
| 3,801,673 | 4/1974 | O'Connell........................... 260/873 |

*Primary Examiner*—Murray Tillman
*Assistant Examiner*—J. Ziegler
*Attorney, Agent, or Firm*—Wenderoth, Lind & Ponack

[57] ABSTRACT

A thermoplastic blend composition having especially superior impact strength and fatigue resistance comprising 15 ro 80% by weight of a polyphenylene oxide, 16 to 75% by weight of a rubber-modified polystyrene, 2 to 15% by weight of an aromatic polycarbonate and 2 to 15% by weight of a high styrene rubber, the sum total of the proportions of these ingredients being 100% by weight.

5 Claims, No Drawings

3,963,804

THERMOPLASTIC BLEND COMPOSITION

FIELD OF THE INVENTION

This invention relates to a rubber-modified polyphenylene oxide resin composition having superior fatigue resistance and processability and high impact strength and comprising as resin ingredients a polyphenylene oxide, a rubber-modified polystyrene, an aromatic polycarbonate and a high styrene rubber.

DESCRIPTION OF THE PRIOR ART

Polyphenylene oxides are thermoplastic resins having superior mechanical properties such as tensile strength and electrical properties such as volume inherent resistivity, dielectric constant or dielectric strength, but they suffer from the defect that they have poor processability and the processed articles have low impact strength. In order to remove these defects, attempts have been made to mix a polyphenylene oxide with other resins. For example, U.S. Pat. No. 3,356,761 discloses a process for preparing a resin composition comprising a polyphenylene oxide and polystyrene by dissolving the polyphenylene oxide in a styrene monomer, and then polymerizing the styrene monomer. U.S. Pat. Nos. 3,373,226 and 3,383,435 disclose a mixture of a polyphenylene oxide and a polystyrene resin. It has frequently been the practice to mix certain resins with other resins physically or chemically in order to improve their properties. However, it is not hardly easy to produce feasible molding materials having balanced properties by mixing two different kinds of resins with each other. For example, U.S. Pat. No. 3,221,080 discloses a resin mixture comprising a polyphenylene oxide and an aromatic polycarbonate, but this mixture is unsuitable as an extrusion or injection-molding material in view of its moldability and the various properties of the molded articles prepared from it.

In the case of mixing three or more kinds of resins, it is far more difficult to prepare a molding composition of balanced properties, since the compatibility of these resins with each other and their melting characteristics become more complicated. Generally, in the case of mixing three or more kinds of resins, attempts have been made to afford affinity among the resins by forming them into a graft, block or random copolymer as is seen in ABS resins.

SUMMARY OF THE INVENTION

Japanese Laid-Open Patent Application No. 16951/73 reports that when a polyphenylene oxide, a polystyrene resin and an aromatic polycarbonate are uniformly dispersed and mixed in predetermined proportions, there can be obtained engineering plastics having very superior fatigue resistance which cannot be usually expected. According to a test for a fatigue limit (repeated fatigue limit) at the end of one million cycles performed by ASTMD 671-63, Method B, (23°C., 50% relative humidity, the testing speed 1800 cycles/min.), the polycarbonate exhibits a fatigue limit of 120 kg/cm$^2$, the commercially available polyphenylene oxide (sold under the registered trademark PPO-534 by General Electric Company) exhibits a fatigue limit of 120 kg/cm$^2$, and the commercially available blend composition of a polyphenylene oxide and a high impact polystyrene (sold under the registered trademark NORYL by General Electric Company) exhibits a fatigue limit of 130 kg/cm$^2$. In contrast, it is reported in this Japanese Application that the above three-component resin composition has a fatigue limit of as high as more than 180 kg/cm$^2$.

We have studied a combination of the above resin composition and a polymer having structural units derived from a conjugated diene monomer with a view to the improvement of the above resin and the development to a resin composition having higher impact strength while retaining the properties inherent to the above resin composition. We have found that the impact strength of the above three-component resin composition can be somewhat improved by using rubber-reinforced polystyrene known as "high impact polystyrene" as a polystyrene component, but have not succeeded in incorporating a higher proportion of the rubbery component in an attempt to improve its impact strength further. When a rubber such as polybutadiene is mixed mechanically with the above composition, the rubber does not conveniently disperse in the resin composition because of the agglomerating tendency of the rubber, and as a result, it is virtually impossible to impart the desired properties.

Accordingly, an object of this invention is to impart superior impact strength to a ternary resin composition comprising a polyphenylene oxide, a polystyrene resin and an aromatic polycarbonate without impairing its inherent characteristics.

Another object of this invention is to provide a process for incorporating a rubbery component in a desired proportion in the above ternary composition by a simple operation.

We have now found that the above objects can be achieved by using a high styrene rubber as a rubbery ingredient for incorporation in the above ternary resin composition. By merely mechanically mixing the high styrene rubber in a suitable proportion with the ternary resin composition, there can be obtained a rubber-modified polyphenylene oxide resin composition containing the elastomeric material in the desired proportion and in the much dispersed state. The resulting resin composition has balanced properties and particularly exhibits superior fatigue resistance and impact strength.

The "high styrene rubber", as used in the present application, denotes an elastomeric material containing 35 to 65% by weight of polymer units derived from an aromatic vinyl monomer, such as styrene, chlorostyrene and/or α-methyl styrene. One example of the high styrene rubber is an elastomeric material obtained by mechanically mixing a polymer of a conjugated diene monomer such as butadiene, isoprene or chloroprene, or a rubbery polymer having a copolymeric structure derived from the above conjugated diene monomer and another polymerizable monomer, for example ethylene, propylene, acrylonitrile and styrene, with a polymer derived from the aromatic vinyl monomer in predetermined proportions. Another example is an elastomeric material obtained by polymerizing the above-mentioned aromatic vinyl monomer, in the presence of the polymer of a conjugated diene monomer or the rubbery polymer mentioned above in bulk, solution or emulsion. Still another example is an elastomeric material of a copolymer obtained by copolymerizing a conjugated diene monomer or a monomeric mixture thereof with other monomers, for example ethylene, propylene, acrylonitrile and styrene with the aromatic vinyl monomer by a suitable method. If desired, a resin composition obtained by mixing, for example in a melt state, a polymer of at least one of the above styrene monomers with the high styrene rubber obtained above can also be used as the high styrene rubber in the present invention.

The high styrene rubber should contain at least 35 to 65% by weight, preferably 40 to 60% by weight, of structural units derived from a conjugated diene monomer. The high styrene rubber itself is not particularly valuable as a molding material. However, it is a very suitable material for incorporating a rubbery component into the above-mentioned ternary resin composition comprising a polyphenylene oxide, a polystyrene resin and an aromatic polycarbonate, and makes it possible to incorporate a rubbery component in a wide range of proportions in the above ternary resin composition. Thus, so long as the high styrene rubber is used in the proportion specified in the present invention, it functions to impart superior impact strength and other properties to molding materials obtained from the composition of this invention.

The polyphenylene oxide constituting the resin composition of this invention is a polymer having a polymeric structure expressed by the following general formula

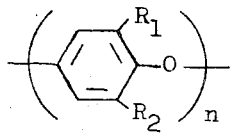

wherein $R_1$ and $R_2$ are the same or different, and each represents a methyl or ethyl group, and $n$ is a positive integer of at least 85.

Typical examples of the polyphenylene oxide are poly(2,6-dimethyl-1,4-phenylene oxide), poly(2-methyl-6-ethyl-1,4-phenylene oxide), and poly(2,6-diethyl-1,4-phenylene oxide). These polyphenylene oxides and methods for their preparation are disclosed, for example, in U.S., Pat. Nos. 3,306,874, 3,306,875, 3,257,357 and 3,257,358.

The rubber-modified polystyrene constituting the resin composition of this invention is a polystyrene resin containing 2 to 15% by weight, based on its total weight, of structural units derived from at least one conjugated diene monomer such as butadiene, isoprene or chloroprene as a rubbery component and structural units derived from an aromatic vinyl monomer such as styrene, chlorostyrene or α-methylstyrene. The aromatic vinyl monomer may be a monomeric mixture of it with other vinyl monomer such as acrylonitrile, methyl methacrylate, butyl methacrylate, methyl acrylate or butyl acrylate, so long as the aromatic vinyl monomer abovementioned is included in a proportion of at least 50% by weight in the monomeric mixture. The structural units derived from aromatic vinyl monomer or the monomeric mixture of it with other monomer may either be introduced in the form of a copolymer or as a polymer mixture into the rubber-modified polystyrene of the present invention.

One example of the rubber-modified polystyrene is a mixture of a polymer of a conjugated diene monomer or a rubbery polymer having a copolymeric structure derived from a conjugated diene monomer and another monomer such as ethylene, propylene, acrylonitrile or styrene and a polymer containing structural units derived from an aromatic vinyl monomer. Another example is a copolymer resin derived from the rubbery component and the styrene resin component, for example, a graft copolymer resin obtained by polymerizing at least one aromatic vinyl monomeric mixture thereof with other monomer described above in the presence of the polymer of a conjugated diene monomer or the rubbery polymer in accordance with bulk, emulsion, solution or suspension polymerization techniques. The rubbery polymer may be the same as above-described.

The aromatic polycarbonate used in this invention is a polymer having structural units expressed by the following general formula

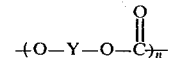

wherein —O—Y—O— is a residue of a dihydric phenol having at least two aromatic rings used as a monomer.

The dihydric phenol used for producing such an aromatic polycarbonate is a polynuclear aromatic compound (HO—Y—OH) containing two hydroxyl groups as functional groups, and the two hydroxyl groups are directly bonded to the carbon atoms of separate aromatic rings. Examples of the dihydric phenol are 2,2-bis(4-hydroxyphenyl) propane, 2,2-bis(4-hydroxyphenyl) pentane, 2,4′-dihydroxydiphenylmethane, bis(2-hydroxyphenyl) methane, bis(4-hydroxyphenyl) methane, 2,2′-bis(4-hydroxy-3,5-dichlorophenyl) propane, and 2,2-bis(4-hydroxy-3,5-dibormophenyl) propane. They are used either alone or in admixture of two or more.

The resin composition of this invention contains 15 to 80% by weight, preferably 25 to 75% by weight, of the polyphenylene oxide, more than 16% by weight but up to 75% by weight, preferably up to 70% by weight, of the rubber-modified polystyrene, 2 to 15% by weight of the aromatic polycarbonate, and 2 to 15% by weight of the high styrene rubber. By using the high styrene rubber described above and maintaining the proportions of the constituents in the above ranges, there can be obtained a resin composition suitable as a molding material having especially high impact strength and superior fatigue resistance and processability and maintaining the balance of the other properties.

Techniques for mixing these resin components include a method wherein pellets or pellets and powders are kneaded and extruded using an extruder, and a method wherein they are kneaded and mixed by a kneader or roll, and extruded into a sheet form. These are conventional mechanical methods that can be operated easily.

As required, it is possible to incorporate various conventional additives in the composition of this invention. Examples of the additives are stabilizers such as alkylphenol compounds, mercaptan compounds, organic disulfide compounds or phosphorous acid esters, organic and inorganic pigments, fire retardants such as phosphoric acid esters, halogen compounds or mixtures of these with antimony compounds, plasticizers of the phosphate type and phthalate type, ultraviolet absorbents, lubricants, and fillers.

The following Examples illustrate the resin composition of this invention, in which all parts and percentages are by weight.

The various properties of the molded articles prepared from the resin composition were measured by the following methods.

Heat distortion temperature

The measurement was made in accordance with ASTM D 648.

Tensile strength

The measurement was made in accordance with ASTM D 638–68 using an Autograph IS-5000 manufactured by Shimazu Seisakusho, Japan.

Elongation

The measurement was made in accordance with ASTM D 638–68.

Flexural strength

The measurement was made in accordance with ASTM D 638.

Tensile impact strength

The measurement was made in accordance with ASTM D 1822 using a test piece of S-type.

Impact strength

The measurement was made in accordance with ASTM D 286 by the notched Izod method.

Repeated fatigue test

The measurement was made in accordance with ASTM D 671–63, Method B, using a universal fatigue tester (UF-IS type, Shimazu Seisakusho), and a test piece of I-type.

The fatigue limit was represented by a value of the maximum load under which the test piece is not broken even after 1.0 million cycles at a testing speed of 1800 cycles/min.

EXAMPLE 1

A. 50.0 Parts of poly(2,6-dimethyl-1,4-phenyleneoxide) having an intrinsic viscosity, as measured on a chloroform solution at 25°C., of 0.50 dl/g, 47.5 parts of a high impact polystyrene as a rubber-modified polystyrene (grafted polymer commercially available; polybutadiene content 8%; the grafting ratio of styrene to polybutadiene was 220%; the melt flow value was $20 - 60 \times 10^{-3}$ cc/sec. as measured by a Koka-type flowtester (Shimazu Seisakusho) at 180°C. under a load of 60 Kg, with a nozzle (having a diameter of 1 mm and a length of 2 mm), and 2.5 parts of an aromatic polycarbonate (product of Mitsubishi Gas Chemical Co.; having an intrinsic viscosity measured on a methylene chloride solution at 20°C. of 0.70 dl/g) were mixed by a blender, and 0.8 parts of a heat stabilizer, 2.0 parts of triphenyl phosphate and 2.0 parts of titanium oxide were mixed, and pellitized in an extruder.

The resulting molding material was injection-molded at an injection temperature of 260° to 280°C. and an injection pressure of 1320 Kg/cm$^2$ and at a die temperature of 90°C. The resulting molded article had a tensile strength of 648 Kg/cm$^2$, an elongation of 28%, a flexural strength of 1034 Kg/cm$^2$, an Izod notched impact strength of 12.5 Kg-cm/cm, a tensile impact strength of 140 Kg-cm/cm$^2$, a heat distortion temperature (after annealing) of 140°C., and a fatigue limit of 180 Kg/cm$^2$.

B. On the other hand, 50 parts of the above polyphenylene oxide was mixed with 50 parts of the above high impact polystyrene, and 0.8 part of a heat stabilizer, 2.0 parts of triphenyl phosphate and 2.0 parts of titanium oxide were added, and the mixture was pelletized under the same conditions as in (A) above. The resulting molding material was injection-molded under the same condition as in (A) above. The resulting molded article had a tensile strength of 620 Kg/cm$^2$, an elongation of 21.0%, an Izod notched impact strength of 9.5 Kg-cm/cm, a tensile impact strength of 127 Kg-cm/cm$^2$, a heat distortion temperature (after annealing) of 138.5°C., and fatigue limit of 130 Kg/cm$^2$.

C. 50 Parts of the same polyphenylene oxide as used in (A) above, 43.5 parts of the same high impact polystyrene as in (A) above, 2.5 parts of the same polycarbonate as in (A) above, 4.0 parts of a high styrene rubber [obtained by mixing in the molten state a styrene/butadiene block copolymer having a solution viscosity of 85 centipoises in a 10% toluene solution at 23°C. with GP polystyrene so that the polybutadiene content became 40%; the melt flow value of $1.1 - 2.2 \times 10^{-3}$ cc/min. as measured at 220°C. under a load of 15 Kg/cm$^2$ using a Koka-type flowtester (Shimazu Seisakusho)], and the same additives as used in (A) above in the same amounts were mixed, and pelletized by an extruder. The molding material obtained was injection-molded under the same conditions as in (A) above. The resulting molded article had a tensile strength of 631 Kg/cm$^2$, an elongation of 30%, a flexiral strength of 1012 Kg/cm $^2$, an Izod notched impact strength of 21 Kg-cm/cm, a tensile impact strength of 169 Kg-cm/cm$^2$, a heat distortion temperature (after annealing) of 140°C., and a fatigue limit of 200 Kg/cm$^2$.

It is seen from the above results that the resin composition of this invention obtained in (C) above had very superior impact strength and fatigue resistance to the compositions outside the scope of the present invention as prepared in (A) and (B) above.

EXAMPLE 2

A mixture consisting of the same polyphenylene oxide, polycarbonate and high styrene rubber as used in Example 1 in proportions of 43.5 parts, 2.5 parts, and 10 parts respectively was mixed with 44.0 parts of rubber modified polystyrene (a styrene/chlorostyrene graft copolymer containing 6% of polybutadiene obtained by polymerizing a mixture of a styrene monomer and a chlorostyrene monomer in a weight ratio of 25 to 75 in bulk in the presence of polybutadiene, and then changing the bulk polymerization system to a suspension polymerization system; and having a melt flow value of $15 \times 10^{-3}$ cc/sec. as measured by the method described above), 1.5 parts of a heat stabilizer, 4.0 parts of titanium oxide, 3.0 parts of a fire-retardant, and 1.5 parts of Sb$_2$O$_3$ as a fire retardant auxiliary. The mixture was pelletized by an extruder, and then injection-molded under the same conditions as in Example 1. The resulting molded article had a tensile strength of 648 Kg/cm$^2$, an elongation of 25%, a flexural strength of 1100 Kg/cm$^2$, an Izod notched impact strength of 23 Kg-cm/cm, a heat distortion temperature (after annealing) of 139°C., and a fatigue limit of 230 Kg/cm$^2$.

EXAMPLE 3

A mixture consisting of the same polyphenylene oxide, high styrene rubber and polycarbonate as used in Example 1 in proportions of 25 parts, 13 parts and 4 parts was mixed with 58 parts of a rubber-modified polystyrene (a graft copolymer containing 6% of polybutadiene obtained by polymerizing a mixture of styrene, α-methylstyrene and chlorostyrene in a weight ratio of 25/5/70 in bulk in the presence of polybutadiene, and then changing the bulk polymerization system to a suspension polymerization system; and having a melt flow value, as measured by the above method, of 14 × 10⁻³ cc/sec.), 1.0 part of a heat stabilizer, 3.0 parts of triphenyl phosphate, 2.0 parts of titanium oxide, and 0.5 part of an ultraviolet absorbent. The resulting mixture was mixed by a blender, and pelletized by an extruder. Then, the pellets were injection-molded at a temperature of 190° to 270°C. The resulting molded article had a tensile strength of 570 Kg/cm², an elongation of 29%, an Izod notched impact strength of 16 Kg-cm/cm, a heat distortion temperature (after annealing) of 127°C., and a fatigue limit of 180 Kg/cm².

EXAMPLE 4

To 65 parts of polyphenylene oxide, 5.0 parts of polycarbonate and 27 parts of high impact polystyrene (containing 8% of polybutadiene), respectively used in Example 1, was added 3.0 parts of an isoprene/styrene copolymer containing 60% of units derived from styrene as a high styrene rubber (having a solution viscosity in a 10% toluene solution at 23°C. of 90 centipoises). The mixture was further mixed with 1 part of a heat stabilizer, 4 parts of triphenyl phosphate and 3 parts of TiO₂ as a pigment, and the resulting mixture was pelletized by an extruder, followed by injection-molding at 260° to 310°C. The resulting molded article had a tensile strength of 730 Kg/cm², an elongation of 25%, a flexural strength of 1200 Kg/cm², an Izod notched impact strength of 12.5 Kg-cm/cm, a heat distortion temperature (after annealing) of 155°C. and a fatigue limit of 190 Kg/cm².

EXAMPLE 5

Example 1 was repeated except that poly(2,6-diethylphenylene oxide) having an intrinsic viscosity, as measured on a chloroform solution at 25°C., of 0.55 d2/g was used as the polyphenylene oxide. The resulting molded article had the following properties:

| | |
|---|---|
| Tensile strength | 625 Kg/cm² |
| Elongation | 33% |
| Izod notched impact strength | 18.5 Kg-cm/cm |
| Heat distortion temperature (after annealing) | 138.5°C. |
| Fatigue limit | 190 Kg/cm² |

What we claim is:

1. In a thermoplastic blend composition having especially superior impact strength and fatigue resistance comprising
    A. 15 to 80% by weight of a polyphenylene oxide having a polymeric structure expressed by the following formula

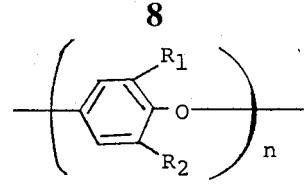

wherein $R_1$ and $R_2$ are the same or different, and each represents a methyl or ethyl group, and $n$ is a positive integer of at least 85,
    B. 16 to 75% by weight of a rubber-modified polystyrene having polymeric units of a conjugated diene monomer and polymeric units of an aromatic vinyl monomer, obtained by polymerizing the aromatic vinyl monomer in the presence of one member selected from the group consisting of a polymer of the conjugated diene monomer and a rubbery polymer which is a copolymer of the conjugated diene monomer and at least one monomer selected from the group consisting of ethylene, propylene, acrylonitrile and styrene, the content of said polymeric units of the conjugated diene monomer in the rubber-modified polystyrene being 2 to 15% by weight, and
    C. 2 to 15% by weight of an aromatic polycarbonate, the improvement wherein the composition further comprises
    D. 2 to 15% by weight of a high styrene rubber having polymeric units of a conjugated diene monomer and polymeric units of an aromatic vinyl monomer, obtained by copolymerizing the conjugated diene monomer and an aromatic vinyl monomer, the content of said polymeric units of the aromatic vinyl monomer in the high styrene rubber being 35 to 65% by weight,
the sum total of the proportions of the components (A), (B), (C) and (D) being 100% by weight.

2. The composition of claim 1 wherein the rubber-modified polystyrene contains polymeric units of at least one aromatic vinyl monomer selected from the group consisting of styrene, chlorostyrene, and α-methyl styrene.

3. The composition of claim 1 wherein the rubber-modified polystyrene contains polymeric units of a vinyl monomeric mixture in which said aromatic vinyl monomer is included in a proportion of at least 50% by weight and the other is at least one vinyl monomer selected from the group consisting of acrylonitrile, alkyl methacrylate and alkyl acrylate.

4. The composition of claim 1 wherein said conjugated diene monomer is at least one member selected from the group consisting of butadiene and isoprene.

5. A composition according to claim 1 wherein the rubber-modified polystyrene (B) is a graft polymer of polybutadiene and styrene and the high styrene rubber (D) is a styrene-butadiene copolymer.

* * * * *